(12) United States Patent
Fujisawa et al.

(10) Patent No.: US 8,228,179 B2
(45) Date of Patent: Jul. 24, 2012

(54) INFORMATION GENERATING DEVICE, CONTROL DEVICE PROVIDED WITH THE SAME, INFORMATION PROVIDING SYSTEM FOR MOBILE BODY, MODULE FOR DRIVER'S SEAT, AND MOBILE BODY

(75) Inventors: Masayuki Fujisawa, Osaka (JP); Fumiaki Fujimoto, Osaka (JP); Teruhisa Masui, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 354 days.

(21) Appl. No.: 12/677,580

(22) PCT Filed: Sep. 3, 2008

(86) PCT No.: PCT/JP2008/065886
§ 371 (c)(1),
(2), (4) Date: Mar. 11, 2010

(87) PCT Pub. No.: WO2009/034899
PCT Pub. Date: Mar. 19, 2009

(65) Prior Publication Data
US 2010/0207750 A1    Aug. 19, 2010

(30) Foreign Application Priority Data

Sep. 14, 2007  (JP) ................................. 2007-239139

(51) Int. Cl.
*B60Q 1/00*   (2006.01)
(52) U.S. Cl. ........ 340/435; 340/438; 340/461; 340/988; 340/995.1; 340/996; 701/23; 701/24; 701/29.1; 701/31.3; 701/420
(58) Field of Classification Search .................. 340/435, 340/438, 461, 988–996; 701/23, 24, 31.4, 701/29.1–31.3, 420
See application file for complete search history.

(56) References Cited

U.S. PATENT DOCUMENTS

2007/0013497 A1\* 1/2007 Watanabe ..................... 340/435
2009/0102632 A1  4/2009 Kobayashi et al.
2009/0157254 A1  6/2009 Nishida et al.

FOREIGN PATENT DOCUMENTS

JP     11-311545 A    11/1999
(Continued)

OTHER PUBLICATIONS

Official Communication issued in International Patent Application No. PCT/JP2008/065886, mailed on Oct. 21, 2008.

*Primary Examiner* — George Bugg
*Assistant Examiner* — Ojiako Nwugo
(74) *Attorney, Agent, or Firm* — Keating & Bennett, LLP

(57) ABSTRACT

A DPF controller (21) easily generates a display identifier and a speech identifier for providing an image and a speech required for driving a mobile body such as an automobile, etc. from state information representing the state of each part of the mobile body. In order to generate a layout identifier (MEN) for specifying a layout of an image to be displayed on a liquid crystal display device (11), an element image identifier (SEN) for specifying a display form of an element image in the layout, and a speech identifier of speech data to be output as display identifiers, the DPF controller (21) matches a MEN/SEN determining table (23) that stores an identifier table defining a correspondence relation between state information (D) and a MEN, a correspondence relation between the state information (D) and a SEN, a correspondence relation between the MEN and the SEN, and a correspondence relation between the state information (D) and a speech identifier with the state information (D) collected from ECUs (30, 40, . . . ) in each part of the mobile body.

10 Claims, 12 Drawing Sheets

FOREIGN PATENT DOCUMENTS

| | | |
|---|---|---|
| JP | 2004-186741 A | 7/2004 |
| WO | 2007/029475 A1 | 3/2007 |
| WO | 2007/032139 A1 | 3/2007 |
| WO | 2007/114166 A1 | 10/2007 |

* cited by examiner

| CAN ID | DLC | DATA1 | DATA2 | DATA3 | DATA4 | DATA5 | DATA6 | DATA7 | DATA8 | Transmission interval |
|---|---|---|---|---|---|---|---|---|---|---|
| (2Bytes) | (1Bytes) | (8Bytes) | | | | | | | | msec |
| 100 | 8 | CAN_V1 | | | | | CAN_V3 | | | 100 |
| 101 | 8 | CAN_V2 | | | | | | | | |
| 102 | 8 | CAN_V6 | CAN_V7 | CAN_V4 | | | | CAN_V5 | | |
| 103 | 8 | CAN_V15 | CAN_V16 | CAN_V17 | CAN_V18 | CAN_V19 | CAN_V20 | CAN_V21 | CAN_V22 | 300 |
| 104 | 6 | CAN_V23 | CAN_V24 | CAN_V25 | CAN_V26 | CAN_V27 | CAN_V28 | | | |
| 105 | 8 | CAN_V42 | CAN_V43 | CAN_V44 | CAN_V45 | CAN_V46 | CAN_V47 | CAN_V48 | CAN_V49 | 200 |
| 106 | 7 | CAN_V50 | CAN_V51 | CAN_V52 | | | | | | |
| 107 | 5 | CAN_V33 | CAN_V34 | CAN_V35 | CAN_V36 | CAN_V37 | | | | 100 |

| Bit7 | Bit6 | Bit5 | Bit4 | Bit3 | Bit2 | Bit1 | Bit0 |
|---|---|---|---|---|---|---|---|
| CAN_V69 | CAN_V68 | CAN_V67 | CAN_V66 | CAN_V65 | CAN_V64 | CAN_V63 | CAN_V62 |

| Bit7 | Bit6 | Bit5 | Bit4 | Bit3 | Bit2 | Bit1 | Bit0 |
|---|---|---|---|---|---|---|---|
| CAN_V57 | CAN_V58 | CAN_V59 | CAN_V60 | | | | |

| Bit7 | Bit6 | Bit5 | Bit4 | Bit3 | Bit2 | Bit1 | Bit0 |
|---|---|---|---|---|---|---|---|
| | | | | | | CAN_V53 | CAN_V54 |

| Bit7 | Bit6 | Bit5 | Bit4 | Bit3 | Bit2 | Bit1 | Bit0 |
|---|---|---|---|---|---|---|---|
| CAN_V79 | CAN_V78 | CAN_V77 | CAN_V76 | CAN_V75 | CAN_V74 | CAN_V73 | CAN_V72 |

FIG. 5

| CAN variable No. | CAN_ID (2 bytes) | Position (2 bytes) | Length (2 bytes) | Bit (2 bytes) | Minimum value (4 bytes) | Maximum value (4 bytes) | Default value (4 bytes) |
|---|---|---|---|---|---|---|---|
| #1 | 100 | 0 | 2 | -1 | 0 | 180 | 0 |
| #2 | 100 | 2 | 2 | -1 | 0 | 20000 | 0 |
| #3 | 100 | 4 | 4 | -1 | 0 | 9999999 | 0 |
| #4 | 101 | 0 | 4 | -1 | 0 | 99999 | 0 |
| ⋮ | | | | | | | |
| #72 | 106 | 6 | 1 | 0 | 0 | 1 | 0 |
| #73 | 106 | 6 | 1 | 1 | 0 | 1 | 0 |
| ⋮ | ⋮ | ⋮ | ⋮ | ⋮ | ⋮ | ⋮ | ⋮ |

| MEN: Layout name | Transition destination MEN | Transition condition ||||
| --- | --- | --- | --- | --- | --- |
| | | Logic expression | Comparison expression | Variable | Value |
| 0:Transition start | 1 | | EQ | Ignition | "OFF" |
| | 2 | | EQ | Ignition | "ACC" |
| | 3 | AND | EQ | Corner sensor (ALL) | "ON" |
| | | | NE | Selection position | "P" |
| | 4 | | EQ | Shift position | "R" |
| | 11 | | EQ | Left winker | "ON" |
| | 12 | | EQ | Right winker | "ON" |
| 1:OFF screen | 2 | | NE | Ignition | "OFF" |
| 2:Accessory | 5 | | NE | Ignition | "ACC" |
| 3:Corner sensor | 6 | OR | EQ | Corner sensor (ALL) | "OFF" |
| | | | EQ | Selection position | "P" |
| 4:Back driving | 6 | | NE | Shift position | "R" |
| 5:Warning screen | 6 | | NE | Shift position | "N" |
| 6:Low-speed driving | 7 | | GE | Speed | 30 |
| 7:Normal driving | 6 | | LE | Speed | 25 |
| | 8 | | GE | Speed | 100 |
| 8:High-speed driving | 7 | | LE | Speed | 95 |
| 9:Low-speed left-turn driving | 6 | | EQ | Left winker | "OFF" |
| | 11 | | GE | Speed | 30 |
| 10:Low-speed right-turn driving | 7 | | EQ | Right winker | "OFF" |
| | 12 | | GE | Speed | 30 |
| 11:Left-turn driving | 7 | | EQ | Left winker | "OFF" |
| | 9 | | LE | Speed | 25 |
| 12:Right-turn driving | 7 | | EQ | Right winker | "OFF" |
| | 10 | | LE | Speed | 25 |

FIG. 9

| | 2 bytes | 4 bytes | 2 bytes | 2 bytes | 2 bytes | 2 bytes |
|---|---|---|---|---|---|---|
| | CAN variable No. | Comparison value | Time(1) | SEN No. (1) | Time(2) | SEN No. (2) |
| | #3 | 1 | 500 | 101 | 500 | 102 |
| | #3 | 0 | 0 | 100 | 0 | 0 |
| | #2 | 0 | 0 | 200 | 0 | 0 |
| | #2 | 1 | 0 | 201 | 0 | 0 |
| | #2 | 2 | 0 | 202 | 0 | 0 |
| | #2 | 3 | 0 | 203 | 0 | 0 |
| | #2 | 4 | 0 | 204 | 0 | 0 |
| | #2 | 5 | 0 | 205 | 0 | 0 |

FIG. 11

| SEN No. | Element image |
|---|---|
| 101 | Right winker [ON] |
| 102 | Right winker [OFF] |
| 200 | Door warning [OK] |
| 201 | Door warning [NG] |
| 210 | Fuel warning [OK] |
| 211 | Fuel warning [NG] |
| 220 | Hydraulic pressure warning [OK] |
| 221 | Hydraulic pressure warning [NG] |
| 230 | Battery warning [OK] |
| 231 | Battery warning [NG] |

FIG. 12

| SEN No. | Speech data file |
|---|---|
| 101 | |
| 102 | |
| 200 | |
| 201 | f201.wav |
| 210 | |
| 211 | f211.wav |
| 220 | |
| 221 | f221.wav |
| 230 | |
| 231 | f231.wav |

INFORMATION GENERATING DEVICE, CONTROL DEVICE PROVIDED WITH THE SAME, INFORMATION PROVIDING SYSTEM FOR MOBILE BODY, MODULE FOR DRIVER'S SEAT, AND MOBILE BODY

TECHNICAL FIELD

The present invention relates to a technique for providing a driver with information required for driving a mobile body such as an automobile, etc., using a dot matrix type display device and a speech reproducing device. In particular, the present invention relates to an information generating device for generating a display identifier and a speech identifier for providing an image and a speech in accordance with the state of a mobile body, a control device provided with the information generating device, an information providing system for a mobile body, a module for a driver's seat, and a mobile body.

BACKGROUND ART

Conventionally, on a dashboard of an automobile or the like, analog-type or counter-type meters, and indicator lamps using, for example, electric bulbs, LEDs, etc. have been used mostly. Further, for digital display or indicator display of numbers, a segmented liquid crystal display unit also has been used generally.

However, recently, a dot matrix type image display device such as a liquid crystal panel display device also has come to be used on the dashboard of the automobile or the like. That is, at least a part of the dashboard is formed of a dot matrix type image display device capable of displaying an arbitrary pattern, and meters such as a speed meter, various indicators, and the like are displayed as images.

Thus, the use of the dot matrix type image display device for the dashboard of the automobile or the like allows the dashboard to have various display patterns. For example, the kinds of meters, indicators and the like to be displayed, and the arrangement or size thereof can be changed dynamically, if required. Further, for example, it also becomes possible to display, side by side, images of meters together with images of scenes outside an automobile photographed by a CCD (Charge Coupled Device) photographing device or the like, images for navigation, etc., and thus, the images of meters and the images other than those of the dashboard can be combined to be displayed.

For example, JP 11(1999)-311545 A discloses a display control device that selects and displays display information to be displayed and a display layout from a plurality of pieces of display information previously set in accordance with the driving situation of a vehicle. In the display control device disclosed by JP 11(1999)-311545 A, display information and a display timing thereof can be added/changed in accordance with a user's request. Further, it also is possible to identify a plurality of users individually and switch display forms for each user.

DISCLOSURE OF INVENTION

Problem to be Solved by the Invention

In recent automobiles, a number of ECUs (Electronic Control Units) are provided in each part of an automobile, and the ECUs are connected through an in-car LAN. Then, each ECU is capable of performing various information processing and controls based on the state information obtained from the other ECUs. For example, a processor of an ECU that manages a drive system including an engine and a power transmission mechanism sends state information such as the rotation number of an engine, a driving speed, and a gear position to an ECU for image display controlling the display of a dashboard. Further, a processor of an ECU that manages a safety system contributing to the safety of an automobile sends, for example, information on lighting states of lights, the open/close states of doors, the presence/absence of abnormality of an air bag, and the fastened states of seat belts. Further, a processor of an ECU that manages an amenity system contributing to the comfortableness inside an automobile sends information such as the blowoff temperature from an air-conditioner and a room temperature to the ECU for image display.

In a conventional information providing system for a mobile body, an ECU for image display generates an image in a predetermined form based on each of a plurality of kinds of information sent from these plurality of ECUs so that a driver easily can recognize the state of each system instinctively. For example, in order to express a driving speed, the ECU for image display generates an image representing a conventional analog-type speed meter or an image displaying a speed as a numerical value. Further, for example, in the case where there is a door that is not closed properly, the ECU for image display generates an image indicating that the door is open. In addition, the ECU for image display generates images representing various indicators such as a gear position indicator, a fuel remaining indicator, and a water thermometer of a radiator. Then, images generated respectively based on various kinds of information are overlaid, whereby one image representing the entire dashboard for an automobile is generated to be displayed on a display device.

However, conventionally, a system has not been established that efficiently generates image information and speech information to be provided to a driver from information sent from the ECUs in each part of an automobile to the ECU for image display. The format of information sent from the ECUs in each part varies generally depending upon automobile manufacturers and vehicle types. Therefore, conventionally, it is necessary to generate a process program for generating image information and speech information from information sent to the ECU for image display for each automobile manufacturer and each vehicle type, which causes time and labor in the development of a program.

In view of the above problems, it is an object of the present invention to provide an information generating device capable of easily generating a display identifier and a speech identifier for providing an image and a speech required for driving a mobile body such as an automobile, etc. from the state information indicating the state of each part of the mobile body, a control device provided with the information generating device, an information providing system for a mobile body, a module for a driver's seat, and a mobile body.

Means for Solving Problem

In order to achieve the above object, an information generating device according to the present invention generates a display identifier for displaying an image in accordance with a situation of a mobile body on a dot matrix type display device based on state information collected from each part of the mobile body and a speech identifier for causing a speech reproducing device to reproduce a speech in accordance with the situation. The display identifier includes a layout identifier for specifying a layout of an image to be displayed on the display device, and an element image identifier for specifying a display form of an element image in the layout. The information generating device includes an identifier storing part that stores an identifier table defining a correspondence relation between the state information and the layout identifier, a correspondence relation between the state information and the element image identifier, a correspondence relation between the layout identifier and the element image identifier, and a correspondence relation between the state information and the speech identifier, and an identifier determining part that acquires the state information collected from each part of the mobile body and matches the acquired state information with the identifier table, thereby determining and outputting a layout identifier, an element image identifier, and a speech identifier in accordance with the situation of the mobile body when the state information is collected.

Further, a control device according to the present invention includes an information generating device according to the present invention, an image storing part that stores a layout image corresponding to each layout identifier and an element image corresponding to each element image identifier, an image combining part that acquires a layout identifier and an element image identifier output from the identifier determining part of the information generating device, and extracts and combines a layout image corresponding to the layout identifier and an element image corresponding to the element image identifier from the image storing part, thereby generating an image to be displayed on the display device, a speech storing part that stores speech data corresponding to each speech identifier, and a speech output part that acquires a speech identifier output from the speech identifier determining part of the information generating device, extracts speech data corresponding to the acquired speech identifier from the speech storing part, and outputs the speech data to a speech reproducing device.

Further, an information providing system for a mobile body according to the present invention includes the control device according to the present invention, a display device that displays an image generated by the image combining part of the control device, and a speech reproducing device that reproduces speech data output from the speech output part.

Further, in order to achieve the above object, a module for a driver's seat according to the present invention is attached around a driver's seat of the mobile body, and includes an information providing system for a mobile body according to any of the above configurations.

Further, a mobile body according to the present invention includes the information providing system for a mobile body of the present invention, wherein the display device is attached to a position where the display device is recognizable visually at least from a driver's seat.

Effects of the Invention

According to the present invention, an information generating device capable of easily generating a display identifier and a speech identifier for providing an image and a speech required for driving a mobile body such as an automobile, etc. from the state information indicating the state of each part of the mobile body in accordance with a situation of the mobile body, a control device provided with the information generating device, an information providing system for a mobile body, a module for a driver's seat, and a mobile body.

BRIEF DESCRIPTION OF DRAWINGS

FIG. 5 is an explanatory diagram showing a format example in the case where state information D is sent on an in-car LAN 70 in accordance with a CAN.

FIG. 7 is an explanatory diagram showing a data example of a region 231$b$.

FIG. 9 is an explanatory diagram showing definition examples in a region 232$c$ of a MEN transition table for realizing the state transition shown in FIG. 8.

FIG. 11 is an explanatory diagram showing an example of the structure of a SEN issuing table.

FIG. 12 is an explanatory diagram showing an example of the correspondence relation between a SEN and an element image.

DESCRIPTION OF THE INVENTION

Figure 1:
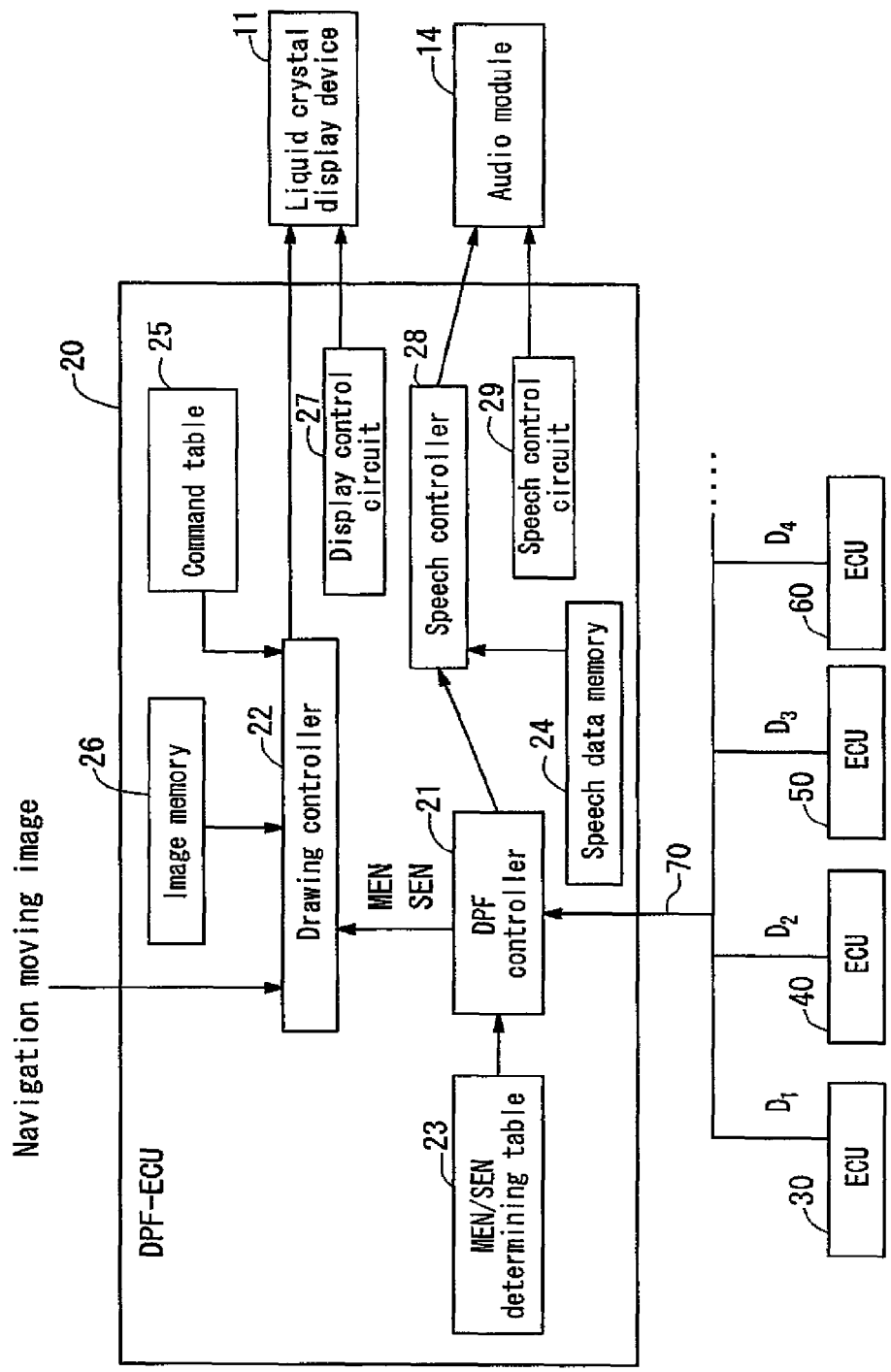
FIG. 1 is a block diagram showing a functional configuration of an information display system for a vehicle or the like according to the present embodiment.

An information generating device according to one embodiment of the present invention generates a display identifier for displaying an image in accordance with a situation of a mobile body on a dot matrix type display device based on state information collected from each part of the mobile body and a speech identifier for causing a speech reproducing device to reproduce a speech in accordance with the situation. The display identifier includes a layout identifier for specifying a layout of an image to be displayed on the display device, and an element image identifier for specifying a display form of an element image in the layout. The information generating device includes an identifier storing part that stores an identifier table defining a correspondence relation between the state information and the layout identifier, a correspondence relation between the state information and the element image identifier, a correspondence relation between the layout identifier and the element image identifier, and a correspondence relation between the state information and the speech identifier, and an identifier determining part that acquires the state information collected from each part of the mobile body and matches the acquired state information with the identifier table, thereby determining and outputting a layout identifier, an element image identifier, and a speech identifier in accordance with the situation of the mobile body when the state information is collected.

According to the above configuration, the identifier determining part acquires the state information collected from each part of the mobile body and matches the acquired state information with the identifier table, thereby determining and outputting a layout identifier, an element image identifier, and a speech identifier in accordance with the situation of the mobile body when the state information is collected. The identifier table defines a correspondence relation between the state information and the layout identifier, a correspondence relation between the state information and the element image identifier, a correspondence relation between the layout identifier and the element image identifier, and a correspondence relation between the state information and the speech identifier. Thus, even in the case where the format of the state information collected from each part of the mobile body varies depending upon the kind of the mobile body, the contents of the identifier table only need to be changed in accordance with the kind of the mobile body, and it is not necessary to change the process of the identifier determining part in accordance with the kind of the mobile body. This enables a display identifier and a speech identifier for providing an image and a speech required for driving a mobile body such as an automobile, etc., to be easily generated from the state information indicating the state of each part of the mobile body in accordance with the situation of the mobile body at that time.

In the above-mentioned information generating device, the identifier table defines a transition relationship between a plurality of layouts and a transition condition to be satisfied by the state information so that a transition is effected between the layouts as a correspondence relation between the state information and the layout identifier, and the identifier determining part matches the acquired state information with the transition condition of the identifier table every time acquiring the state information collected from each part of the mobile body, thereby determining and outputting a layout identifier of a layout that is to be a transition destination.

Further, in the information generating device according to the present embodiment, it is preferred that the transition condition is defined by a comparison expression of a variable contained in the state information and a predetermined value in the identifier table, and the identifier table includes a variable conversion table for extracting the variable from the state information.

In the information generating device according to the present embodiment, it is preferred that the identifier table defines a display form of an element image to be included in each layout as a correspondence relation between the layout identifier and the element image identifier, and the identifier determining part matches the acquired state information with the identifier table every time acquiring the state information collected from each part of the mobile body, thereby determining a layout identifier and an element image identifier, and determines an element image identifier associated with the determined layout identifier in a correspondence relation between the layout identifier and the element image identifier as an element image identifier to be output.

Further, a control device according to one embodiment of the present invention includes the information generating device according to any one of the above configurations, an image storing part that stores a layout image corresponding to each layout identifier and an element image corresponding to each element image identifier, an image combining part that acquires a layout identifier and an element image identifier output from the identifier determining part of the information generating device, and extracts and combines a layout image corresponding to the layout identifier and an element image corresponding to the element image identifier from the image storing part, thereby generating an image to be displayed on the display device, a speech storing part that stores speech data corresponding to each speech identifier, and a speech output part that acquires a speech identifier output from the speech identifier determining part of the information generating device, extracts speech data corresponding to the acquired speech identifier from the speech storing part, and outputs the speech data to a speech reproducing device.

Further, an information providing system for a mobile body according to one embodiment of the present invention includes the control device, a display device that displays an image generated by the image combining part of the control device, and a speech reproducing device that reproduces speech data output from the speech output part. Furthermore, in this display device, it is preferred that the display device is a liquid crystal display device.

Further, a module for a driver's seat according to one embodiment of the present invention is attached around a driver's seat of the mobile body and includes the above-mentioned information providing system for a mobile body.

A mobile body according to one embodiment of the present invention includes the above-mentioned information providing system for a mobile body, wherein the display device is attached to a position where the display device is recognizable visually at least from a driver's seat. Further, in the case where the mobile body is an automobile, it is preferred that the state information is sent from an ECU provided in each part of the automobile to be collected in the information generating device via an in-car network.

Hereinafter, one embodiment of the present invention in the case where the present invention is applied to an automobile (passenger car) will be described specifically with reference to the drawings. An object to which the present invention is applied is not limited to an automobile. The present invention also is applicable to various vehicles (movement means or transportation means) such as an automatic two-wheel vehicle, an automatic three-wheel vehicle, a special vehicle, a railroad vehicle, other road vehicles, an amtrac, an airplane, or a ship, in addition to an automobile. Further, the present invention also is applicable to a simulator that allows a user to experience the driving of the above-described various vehicles pseudomonically without being limited to vehicles, the main purposes of which are the movement or transformation as described above. In the present application, the vehicles, simulators, and the like as described above will be referred to as a "mobile body" collectively.

Figure 2:
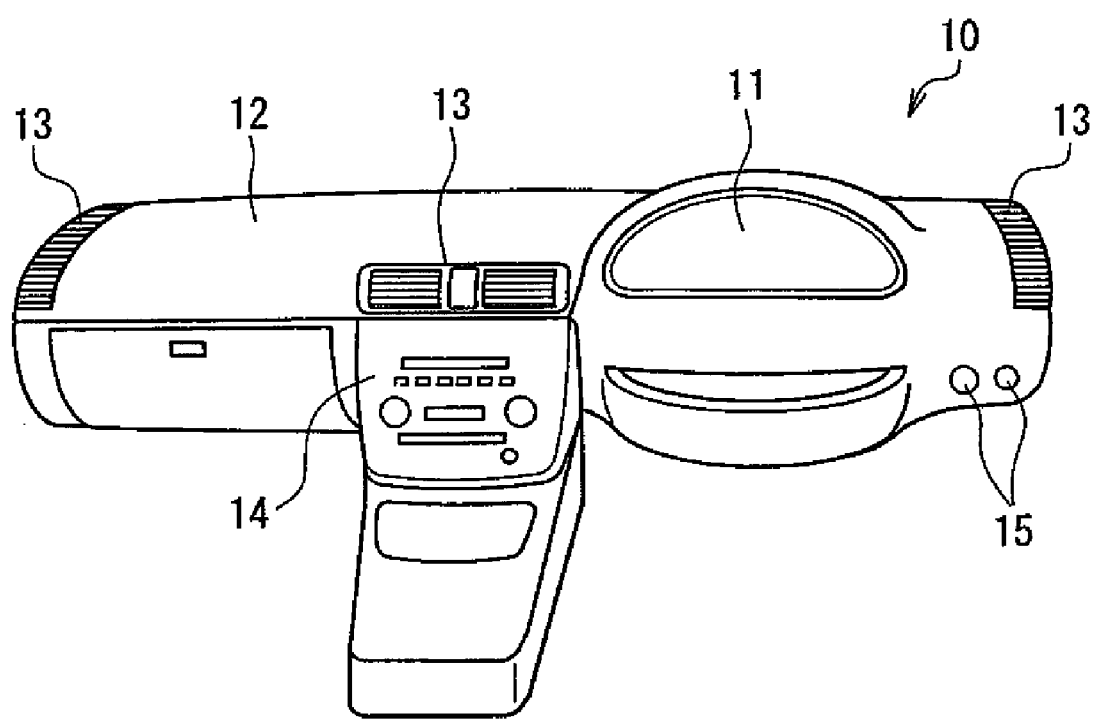
FIG. 2 is a front view showing an external appearance of a cockpit module (module for a driver's seat) for an automobile in which an information display system for a vehicle or the like according to one embodiment of the present invention is incorporated.

FIG. 2 is a front view showing an external appearance of a cockpit module (module for a driver's seat) for an automobile in which an information providing system for a vehicle or the like according to the present embodiment is incorporated. As shown in FIG. 2, a cockpit module 10 for an automobile according to the present embodiment includes a liquid crystal display device 11 displaying a combined image of a dashboard for an automobile, in place of a conventional dashboard for an automobile including a conventional analog meter such as a speed meter and a tachometer, an indicator lamp formed of, for example, LEDs, and the like.

The liquid crystal display device 11 is not a segmented liquid crystal display unit used mostly even in conventional automobiles, but a dot matrix type liquid crystal display device. The liquid crystal display device 11 is capable of displaying an image with an arbitrary pattern, and hence, functions as an information display device for an automobile by displaying combined images acquired by combining various element images of various meters, an indicator lamp, and the like. The liquid crystal display device 11 can display not only an image of a dashboard, but also images photographed by a car-mounted camera set at the back of or on the side of an automobile, a navigation image, or a received image of television broadcast or a reproduced image of a car-mounted DVD player, or the like.

The liquid crystal display device 11 is attached to an instrument panel 12 that is a frame of the cockpit module 10 so as to be positioned on a back side of a steering wheel (not shown). The cockpit module 10 includes an air-conditioning unit (not shown), an air-conditioning duct 13 for introducing air from the air-conditioning unit into an automobile, an audio module 14, a lamp switch 15, a steering mechanism (not shown), an air bag module (not shown) and the like, in addition to the liquid crystal display device 11.

The audio module 14 functions as a speech reproducing device that outputs a warning speech, an operation instruction, and the like in accordance with the state of an automobile, in addition to the function of radio broadcasting, music CD reproduction, and the like. The audio module 14 is connected to a loudspeaker (not shown) provided at a door of an automobile, a back end in an automobile, and the like.

The configuration of the cockpit module shown in FIG. 2 is shown merely for an illustrative purpose, and the embodiment of the present invention is not limited thereto. For example, in the example shown in FIG. 2, although the liquid crystal display device 11 is placed so as to be opposed to a driver, the present invention is not limited thereto, and the liquid crystal display device 11 may be placed in a center portion of an instrument panel, i.e., between a driver's seat and a passenger's seat.

FIG. 1 is a block diagram showing an example of a functional configuration of an information providing system for an automobile according to the present embodiment. The display in the liquid crystal display device 11 and the speech output by the audio module 14 are controlled by a DPF (Display Platform)-ECU 20 shown in FIG. 1. The DPF-ECU 20 is one of a number of ECUs mounted on an automobile. The DPF-ECU 20 includes a DPF controller 21 (identifier determining part), a drawing controller 22 (image combining part), a MEN/SEN determining table 23 (identifier storing part), a command table 25, an image memory 26 (image storing part), a display control circuit 27, a speech data memory 24 (speech storing part), a speech controller 28 (speech output part), and a speech control circuit 29. Herein, the DPF controller 21 and the MEN/SEN determining table 23 are one embodiment of the information generating device according to the present invention, and the DPF-ECU 20 is one embodiment of the control device according to the present invention.

Although FIG. 1 shows the inner configuration of the DPF-ECU 20 as a functional block, various embodiments are considered as a mounting embodiment of each block on hardware. For example, all the functional blocks shown in FIG. 1 may be mounted on one circuit board, or the functional blocks shown in FIG. 1 also may be mounted, for example, under the condition of being divided into a plurality of semiconductor integrated circuits. In the case of the latter, for example, the DPF controller 21 and the MEN/SEN determining table 23 also can be formed of a semiconductor integrated circuit independent from the other functional blocks. Further, in the example shown in FIG. 1, although the image memory 26 and the speech data memory 24 are shown as separate functional blocks, these memories may be integrated as one memory element. Further, in the example shown in FIG. 1, although the drawing controller 22 and the speech controller 28 are shown as separate functional blocks, the functions of these controllers also can be realized with a single circuit element.

The DPF-ECU 20 is connected to various ECUs 30, 40, 50, 60, . . . provided in each part of an automobile via the in-car LAN 70. The DPF-ECU 20 acquires information (state information) D1 to D4, . . . (hereinafter, collectively referred to as state information D, unless otherwise required) indicating the state of each part of an automobile in a predetermined period. The "predetermined period" is set to be an arbitrary length in accordance with the specifications of the in-car LAN 70 and the like. Further, the transmission periods of the state information D1 to D4, . . . from each ECU may be different from each other. In this case, the sampling periods of the state information D1 to D4, . . . in the DPF-ECU 20 may be matched with the transmission period of each state information. The DPF-ECU 20 generates a combined image of a dashboard for an automobile and the like for presenting the state of an automobile and the like to a driver so that the driver can understand it easily, based on the acquired state information. The generated image is sent from the DPF-ECU 20 to the liquid crystal display device 11 to be displayed. Further, the DPF-ECU 20 generates speech data for outputting a warning speech, an operation instruction, and the like in accordance with the state of an automobile and the like, based on the acquired state information. The generated speech data is output from the DPF-ECU 20 to the audio module 14 to be reproduced.

The "state information" refers to the information indicating the state of each part of an automobile, as described above, and may include various pieces of information such as information (for example, a fuel remaining amount, a room temperature, etc.) concerning the state not related directly to the mechanical operation of each part, in addition to the information (for example, a driving speed, an engine rotation number, etc.) concerning the mechanical operation state of each part of an automobile. These pieces of information are mere examples in the case of a passenger car. Examples of the state information include, but are not limited to, the rotation number of an engine, a driving speed, a selection position, a shift position, the activation state of a direction indicator, the lighting states of lights, the open/close state of a door and a trunk, the state of door locking, the state of a tire, the presence/absence of abnormality of an air bag, the fastened state of a seat belt, the blowoff temperature from an air-conditioner, a room temperature, an outside temperature, the state of a car-mounted AV appliance, the setting of an automatic operation function, the activation state of a wiper, a fuel remaining amount, a battery remaining amount, the dependence degree (in the case of a hybrid car) between an engine and a battery, an oil remaining amount, a radiator temperature, and an engine temperature.

The DPF controller 21 is a microcomputer that controls the entire operation of the DPF-ECU 20. The DPF controller 21 also functions as an identifier determining part that matches the state information D with the MEN/SEN determining table 23, thereby generating display identifiers (a MEN, a SEN) designating what image should be generated in accordance with the state of an automobile at that time, and sends the display identifiers to the drawing controller 22. The display identifiers (a MEN, a SEN) generated by the DPF controller 21 will be described in detail later. Further, the DPF controller 21 matches the state information D with the MEN/SEN determining table 23, thereby generating a speech identifier corresponding to speech data to be output in accordance with the state of an automobile at that time, and sends the speech identifier to the speech controller 28.

The drawing controller 22 generates an image to be displayed on the liquid crystal display device 11 based on the display identifier given by the DPF controller 21, with reference to the image memory 26 and the command table 25. Further, the DPF-ECU 20 also can input a moving image such as a navigation image from a storage device (not shown) such as a hard disk provided in an automobile. This enables the drawing controller 22 to incorporate a moving image into a combined image, if required.

The display control circuit 27 includes various circuits controlling the display of the liquid crystal display device 11, such as a power supply circuit, a gray-scale voltage generating circuit, and various driver driving circuits of the liquid crystal display device 11, and a backlight control circuit. It should be noted that the driver driving circuit and the like may be formed on a liquid crystal panel of the liquid crystal display device 11.

The speech data memory 24 previously stores speech data to be output in accordance with the state of an automobile. The speech controller 28 extracts speech data in accordance with the speech identifier given by the DPF controller 21 from the speech data memory 24 and outputs the speech data to the audio module 14. The speech control circuit 29 controls the speech reproducing operation in the audio module 14. The speech data memory 24 may store the speech data to be output on a full text basis. Alternatively, the speech data memory 24 may store speech data, for example, on a word basis or a phoneme basis, and the speech controller 28 may output the speech synthesized using a speech synthesis technique to the audio module 14.

The MEN/SEN determining table 23 is used for determining a MEN (main event number) and a SEN (sub event number) that are display identifiers, based on the state information D acquired from the ECUs 30, 40, 50, 60, . . . via the in-car LAN 70.

Hereinafter, the MEN and SEN that are display identifiers will be described in detail. The MEN is an identifier for specifying a layout of an image to be displayed on the liquid crystal display device 11. On the other hand, the SEN is an identifier for specifying a display form of each element image in the layout specified by the MEN. Values of the MEN and SEN are defined in the MEN/SEN determining table 23 in accordance with various values that can be taken by the state information D. The DPF controller 21 matches the acquired state information D with the MEN/SEN determining table 23 every time acquiring the state information D from the in-car LAN 70, thereby determining the values of the MEN and SEN in accordance with the state information D, and outputs them to the drawing controller 22.

Each layout specified by the MEN defines what image should be displayed in which portion of the display screen of the liquid crystal display device 11. In the information providing system for an automobile in the present embodiment, values of the MENs different from each other are defined with respect to various situations determined from the content of the state information D, whereby suitable information display in accordance with the situation of an automobile at that time is realized.

For example, in the case where an automobile is being driven, it is necessary to display a speed meter and a tachometer. However, in the case where an automobile is at a standstill with an engine stopped, it is not necessary to display these meters, and a navigation image and the like are rather required in most cases. Thus, in the former, for example, a layout displaying meters such as a speed meter and a tachometer is used, whereas in the latter, it is preferred to use a layout in which a region for displaying a navigation image and the like is kept large without displaying meters. Further, for example, in the case of a vehicle type in which cameras capable of photographing the state of the outside of an automobile are provided at the back of and on the side of the automobile, it is preferred to use a layout including display regions of images photographed by these cameras in the case of reverse driving or parallel parking. Thus, the information providing system for an automobile in the present embodiment determines the state of the automobile at that time from the state information D and displays the information on the liquid crystal display device 11 using the layout suitable for the state of the automobile at that time, thereby providing required information to a driver so that the driver can see it easily.

Figure 3A:
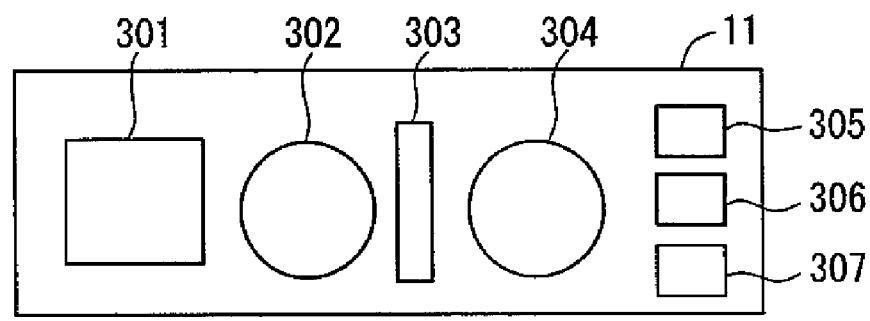
FIGS. 3A and 3B are plan views respectively showing an example of a layout specified by a MEN.
Figure 3B:
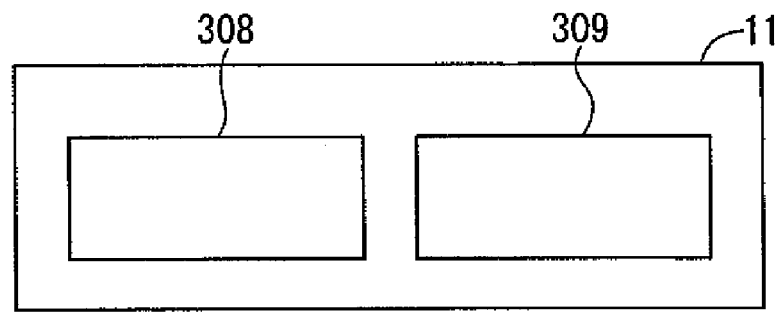

Herein, FIGS. 3A and 3B show specific examples of a layout of an image to be displayed on the liquid crystal display device 11. In the layout shown in FIG. 3A, a region 301 for displaying a car navigation image, a region 302 for displaying an image of a speed meter, a region 303 for displaying an image of a gear indicator, a region 304 for displaying an image of a tachometer, and regions 305 to 307 for displaying images of various warning lights are defined. Further, in the layout shown in FIG. 3B, a region 308 for displaying a car navigation image and a region 309 for displaying a video photographed by a camera provided at the back of an automobile are defined. The layouts shown in FIGS. 3A and 3B are assigned MENs having values different from each other. For example, the layout shown in FIG. 3A is used in the case of normal driving, and the layout shown in FIG. 3B is used in the case where a gear is shifted to R (reverse driving). The layouts shown in FIGS. 3A and 3B are merely examples.

Figure 4A:
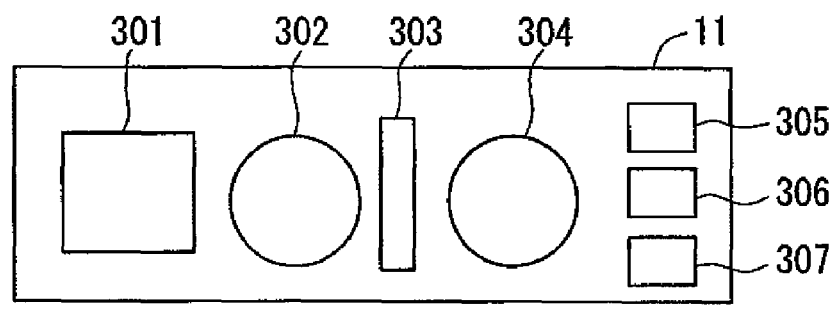
FIGS. 4A and 4B are plan views respectively showing an example of a display form of an element image specified by a SEN.
Figure 4B:
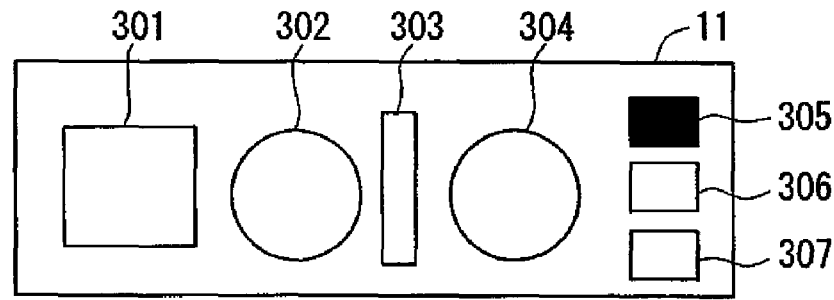

A SEN is defined as an identifier for specifying the display form of an element image to be displayed in each region of a layout with respect to the layout specified by the MEN as described above. For example, FIGS. 4A and 4B show display examples of the liquid crystal display device 11 in the case where values of the SENs different from each other are given with respect to the layout in FIG. 3A. For example, in the example shown in FIG. 4A, an image of a warning light is not displayed in the region 305 displaying an image of a warning light. On the other hand, in the example shown in FIG. 4B, an image showing the lighting of a door warning light for warning that a door of an automobile is opened is displayed in the region 305. Thus, by defining the values of a plurality of SENs with respect to the layout specified by one MEN, the display form of element images in the layout can be varied.

Further, in the present embodiment, speech data to be output is associated with a combination of a MEN and a SEN. Speech data is not required to be associated with all the combinations of MENs and SENs, and a speech may be output only in a required situation.

Hereinafter, one example of a method will be described in detail, in which the DPF controller 21 matches the state information D with the MEN/SEN determining table 23, thereby determining the values of a MEN and a SEN in accordance with the state of an automobile at that time. The following specific data format is an example in the case where a CAN (Control Area Network) widely adopted mainly in Europe is adopted as an interface of the in-car LAN 70. However, the interface specification of the in-car LAN to which the present invention is applicable is not limited to the CAN. For example, any car-mounted network in accordance with various in-car LAN interface specifications such as a LIN (Local Interconnect Network), a MOST (Media Oriented Systems Transport), or a FlexRay can be applied to the present invention.

First, a format example in the case where the state information D is sent on the in-car LAN 70 in accordance with the CAN will be described with reference to FIG. 5. In the state information D (hereinafter, referred to as "CAN data") sent in accordance with the CAN, for example, as shown in FIG. 5, the leading two bytes have CAN_ID, and the subsequent one byte indicates an effective data length in DATA1 to DATA8 in the 4th and subsequent bytes. Further, the CAN data contains a variable (CAN variable) indicating the state of each part of an automobile acquired by each ECU in DATA1 to DATA8 in the 4th and subsequent bytes.

Further, it is determined for each automobile manufacturer or vehicle type which CAN variable is included in which position of which CAN_ID. For example, in the example shown in FIG. 5, two bytes of DATA1 to DATA2 indicate one CAN variable ($CAN\_V_1$) in CAN data of CAN_ID=100. In the present embodiment, the $CAN\_V_1$ indicates, for example, a driving speed. Further, two bytes of DATA3 to DATA4 indicate one CAN variable ($CAN\_V_2$), and in the present embodiment, the $CAN\_V_2$ indicates, for example, an engine rotation number. Further, four bytes of DATA5 to DATA8 indicate one CAN variable ($CAN\_V_3$). In the present embodiment, the $CAN\_V_3$ indicates the driving distance of an odometer, for example. Herein, a number (value of x in $CAN\_V_x$) assigned to each CAN variable is merely assigned for convenience of description of FIG. 5, and the order thereof has no special meaning. Further, the number x is not used in the process of the DPF controller 21.

Although a CAN variable can take a length of at most 8 bytes, the shortest length is one bit. For example, in the CAN data of CAN_ID=106, the lowest-order bit (Bit0) to Bit3 in one byte of DATA3 include four CAN variables ($CAN\_V_{57}$ to $CAN\_V_{60}$) each having a length of one bit. Similarly, in the CAN data of CAN_ID=106, Bit0 to Bit7 of DATA4 include 8 CAN variables ($CAN\_V_{62}$ to $CAN\_V_{69}$) each having a length of one bit. Further, similarly, in the CAN data of CAN_ID=106, Bit0 to Bit1 of DATA6 include two CAN variables ($CAN\_V_{53}$ to $CAN\_V_{54}$) each having a length of one bit, and Bit0 to Bit7 of DATA7 include 8 CAN variables ($CAN\_V_{72}$ to $CAN\_V_{79}$) each having a length of one bit. The CAN variable represented by one bit indicates, for example, the state information represented by two values (ON/OFF, etc.), such as the open/close state of various doors and the operation state of a winker. For example, in the present embodiment, $CAN\_V_{72}$ indicates the open/close state of a right door, and $CAN\_V_{73}$ indicates the open/close state of a left door.

As shown in FIG. 5, the transmission interval of CAN data is not necessarily uniform. For example, although the transmission interval of the CAN data of CAN_ID=100 to 102, 107 is 100 msec, the transmission interval of the CAN data of CAN_ID=103 is 300 msec, and the transmission interval of the CAN data of CAN_ID=104 to 106 is 200 msec. Thus, the DPF controller 21 may sample these CAN data in a period in accordance with the transmission interval of each CAN data as the state information D and perform the process described later.

Figure 6:
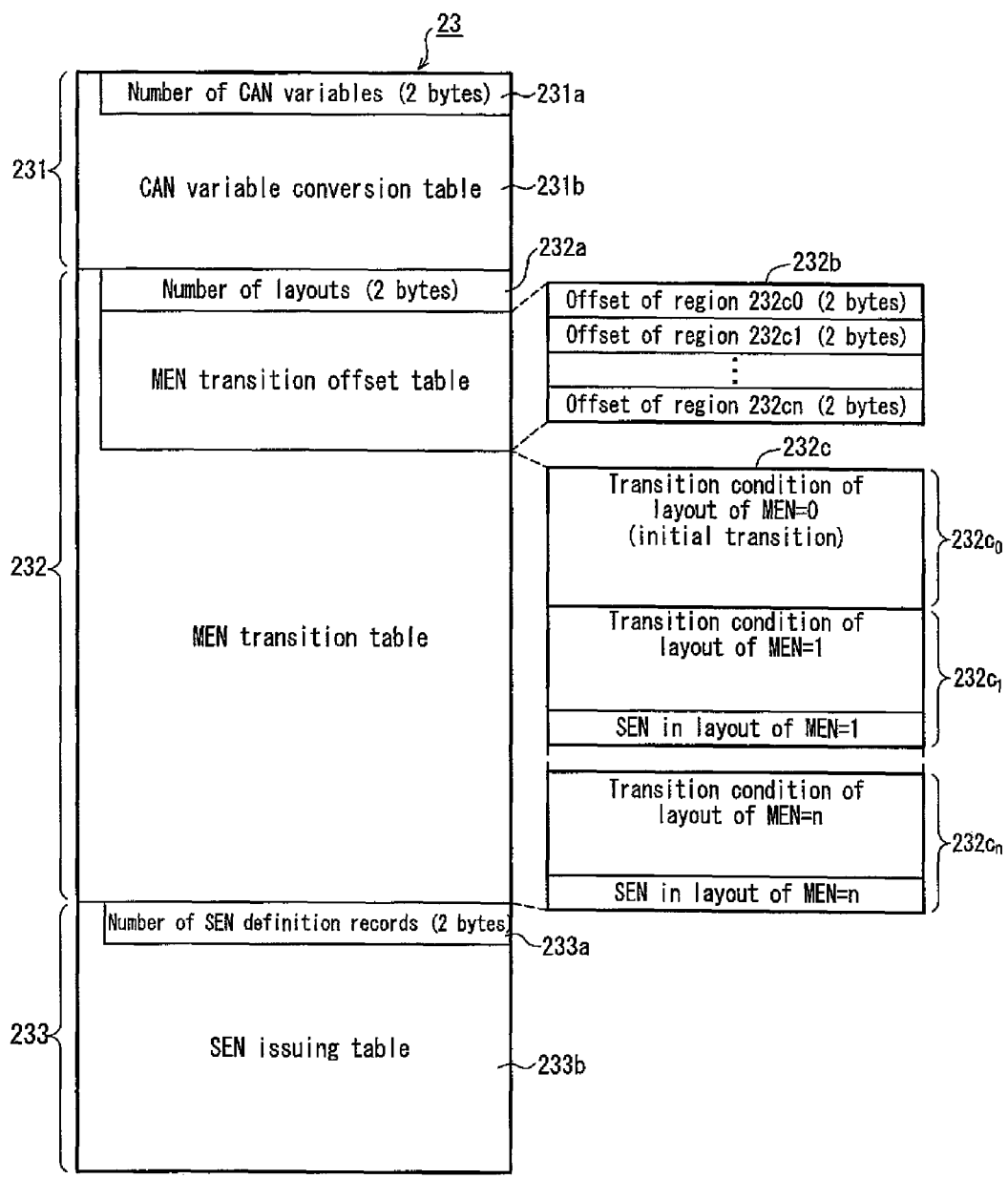
FIG. 6 is an explanatory diagram showing an example of a logic structure of a MEN/SEN determining table used for determining a MEN and a SEN from CAN data.

Next, FIG. 6 shows one example of a logic structure of the MEN/SEN determining table 23 used for determining a MEN and a SEN from the above-mentioned CAN data. In the example shown in FIG. 6, the MEN/SEN determining table 23 is composed of a CAN variable conversion table 231, a MEN conversion table 232, and a SEN issuing table 233.

The CAN variable conversion table 231 is a table to which the DPF controller 21 refers for extracting the above-mentioned CAN variables from the CAN data. More specifically, as described above, it is determined for each automobile manufacturer or vehicle type which CAN variable is included in which position of the CAN data of which CAN_ID. Thus, it is necessary to prepare the CAN variable conversion table 231 for each automobile manufacturer or vehicle type.

As shown in FIG. 6, the CAN variable conversion table 231 has a region 231*a* storing the number of CAN variables and a region 231*b* storing the definition of each CAN variable. FIG. 7 is an explanatory diagram showing a data example of the region 231*b*. As shown in FIG. 7, the region 231*b* stores, with respect to each of all the CAN variables included in CAN data, CAN_ID of CAN data containing the CAN variable, the position and length of the CAN variable in the CAN data, a bit position ("Bit" in FIG. 7) in the case where the CAN variable is data on a bit basis, a minimum value, a maximum value, and a default value.

In the data example of the region 231*b* shown in FIG. 7, "Position" in the CAN data indicates an offset position of the CAN variable on a byte basis, assuming that the start position of DATA1 is 0 in the format of the CAN data shown in FIG. 5. Thus, the minimum value at the offset position is 0, and the maximum value at the offset position is 7. In the case where the length of the CAN variable is 2 or more, "Length" is stored in Little endian. "Bit" is used in the case where the CAN variable is data of one bit, and indicates in how-manieth bit data is present. More specifically, in the case where the value of "Position" is k, Bit=0 indicates that data is present in the rightmost bit (lowest-order bit) of DATA (k+1) bytes, and Bit=1 indicates that data is present in the second order of magnitude from the lowest order of DATA (k+1) bytes. In the case where the CAN variable is not data of one bit, Bit=−1.

Further, the minimum value and the maximum value indicate the minimum value and the maximum value of a CAN variable sent from each ECU. This is used for checking whether the value of the CAN variable is in a normal range in the DPF-ECU 20. In the case where the value of the CAN value is larger than the maximum value, the subsequent process is performed, assuming that the maximum value defined herein has been sent. Further, in the case where the value of the CAN variable is smaller than the minimum value, the subsequent process is performed, assuming that the minimum value defined herein has been sent. The default value is used as an initial value of each ECU at startup of the DPF controller 21.

Further, numbers with a symbol "#" provided outside of the column of FIG. 7 indicate numbers of the respective CAN variables (hereinafter, referred to as "CAN variable numbers"). Although the CAN variable numbers are used in the process in the DPF controller 21 described later, the CAN variable numbers are not defined explicitly in the CAN variable conversion table 231 and are assign numbers increasing by one from #1 by the DPF controller 21 in the order in which they are stored in the region 231*b* of the CAN variable conversion table 231.

Thus, according to the example shown in FIG. 7, CAN variable numbers #1 to #4 are respectively assigned to $CAN\_V_1$ to $CAN\_V_4$ of the CAN variable conversion table 231 illustrated in FIG. 5. Further, CAN variable numbers #72 and #73 are respectively assigned to $CAN\_V_{72}$ to $CAN\_V_{73}$ of the CAN variable conversion table 231 illustrated in FIG. 5. In the description herein, a number (x) of $CAN\_V_x$ defined in the format of CAN data is matched with the CAN variable number (#j); however, the order of CAN variables defined in the format of the CAN data is not necessarily matched with the CAN variable numbers determined by the CAN variable conversion table 231.

Next, the MEN transition table 232 will be described. As shown in FIG. 6, the MEN transition table 232 is composed of a region 232*a* storing the number of layouts defined by the MEN transition table 232, a region 232*c* storing transition conditions to each layout of a plurality of layouts, and a region $232b$ storing an offset of a storage region of each layout transition condition.

Figure 8:
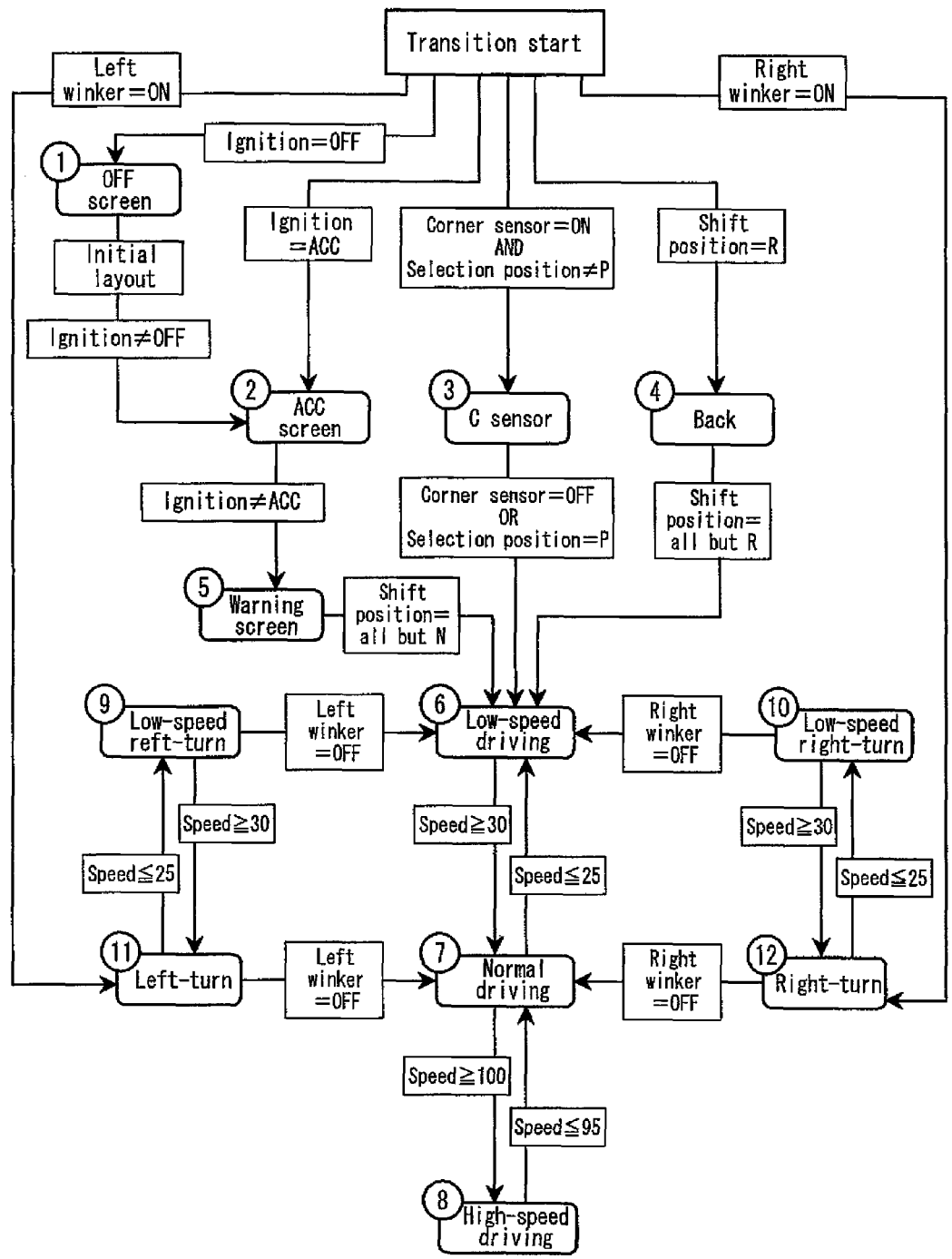
FIG. 8 is a state transition diagram showing the transitions between a plurality of layouts used for display of a liquid crystal display device 11 in an information display system for an automobile of the present embodiment.

Herein, the MEN and layout transition conditions will be described with reference to FIGS. 8 and 9. FIG. 8 is a state transition diagram showing the transitions between a plurality of layouts used for display in the liquid crystal display device 1 in the information providing system for an automobile in the present embodiment.

The state transition diagram shown in FIG. 8 is created when it is determined how the display on the liquid crystal display device 11 is shifted in accordance with the state information D (CAN data) at a time of designing the information providing system for an automobile. In the state transition diagram shown in FIG. 8, there are 12 kinds of layouts indicated by MEN=1 to 12.

Arrows shown in the state transition diagram of FIG. 8 indicate the transition relationships between layouts, and the conditions described on the arrows are transition conditions to be satisfied for effecting the transitions. Each transition condition is expressed by a comparison expression between a CAN variable and a predetermined value. For example, in order for the layout of "OFF screen" at MEN=1 to be shifted to the layout of "ACC screen" at MEN=2, it is necessary that the following transition condition holds: the value of "Ignition" which is one CAN variable is not equal to "OFF".

In the case where the DPF controller 21 determines a layout at a transition destination every time acquiring CAN data from the in-car LAN 70, the DPF controller 21 starts determining a transition condition from the state of "Transition start" shown in FIG. 8 without fail, irrespective of which layout the immediately preceding layout is. Although there is no layout corresponding to the state of "Transition start", MEN=0 is allocated to the state of "Transition start" for convenience.

FIG. 9 is an explanatory diagram showing definition examples in the region $232c$ of the MEN transition table 232 for realizing the state transition shown in FIG. 8. For ease of description, FIG. 9 shows only descriptions of information on the state transition in a conceptually organized manner, among information described in the region $232c$ of the MEN transition table 232, and does not show the data structure of the actual region $232c$. For example, the CAN variable is expressed by the name of the state information indicated by each CAN variable, instead of the above-mentioned CAN variable number; however, in the actual MEN transition table, the CAN variable numbers (#j) determined by the CAN variable conversion table 231 are used as described above.

As shown in FIG. 9, in the region $232c$ of the MEN transition table 232, regarding each layout, a MEN of a layout that is a transition destination from that layout and a transition condition for effecting the transition are defined. In the region $232c$ in FIG. 9, a region where a transition condition with respect to a layout of MEN=n (n is an integer of 0 to 12) is represented by a region $232c_n$.

For example, the leading end of a region $232c_0$ defines as follows: when a transition condition that a value of a CAN variable representing the state of "Ignition" is "OFF" holds in the state of "Transition start" assigned MEN=0, the transition to a layout specified by MEN=1 is effected. The layout specified by MEN=1 is a layout of "OFF screen" in the example shown in FIG. 8.

Further, in the region $232c$ of the MEN transition table 232, the transition condition in which the transition from a layout to another layout is effected also can be represented as AND or OR of at least two conditions. For example, in the example shown in FIG. 8, the transition condition from the state of "Transition start" of MEN=0 to the layout of "Corner sensor" of MEN=3 is as follows: the condition that the value of a CAN variable representing the state of "Corner sensor" is "ON" and the condition that the value of a CAN variable representing the state of "Selection position" is not "P" are both satisfied. In the region $232c$ of the MEN transition table 232, the transition condition by such an AND condition can be defined, for example, as represented in the region $232c_0$ in FIG. 9. Further, in the example shown in FIG. 8, the transition condition from the layout of "Corner sensor" of MEN=3 to the layout of "Low-speed driving" of MEN=6 is as follows: either the condition that the value of a CAN variable representing the state of "Corner sensor" is "OFF" or the condition that the value of a CAN variable representing the state of "Selection position" is "P" is satisfied. In the region $232c$ of the MEN transition table 232, the transition condition by such an OR condition can be defined, for example, as represented in the region $232c_3$ in FIG. 9.

Further, regarding the regions $232c_1$ to $232c_{12}$, as shown in FIG. 6, at the end of each region, the values of SENs specifying the display forms of element images that can be contained in the respective layouts are listed. More specifically, each layout specified by one MEN can contain one or a plurality of element images in various display forms. The SENs are allocated peculiarly to display forms with element images different from each other. As described later, the value of a SEN is determined by the DPF controller 21 based on a rule different from that of the MEN in accordance with the contents of CAN data. At this time, by defining SENs that can be contained in the respective layouts specified by MENs in the regions $232c_1$ to $232c_{12}$, the DPF controller 21 can determine which SEN should be output to the drawing controller 23 among the SENs determined from the CAN data. One or a plurality of SENs can be determined with respect to one MEN.

In the region $232b$ shown in FIG. 6, leading addresses (offsets) of the regions $232c_0$ to $232c_{12}$ are stored respectively. When the MEN (MEN=n) of a transition destination is determined, the DPF controller 21 acquires an offset of the region $232c_n$ in which the transition condition with respect to the layout of the MEN is stored, with reference to the region $232b$, and accesses the region.

Hereinafter, the procedure of the process in which the DPF controller 21 determines a MEN and a SEN when acquiring CAN data will be described with reference to a flowchart shown in FIG. 10.

Figure 10:
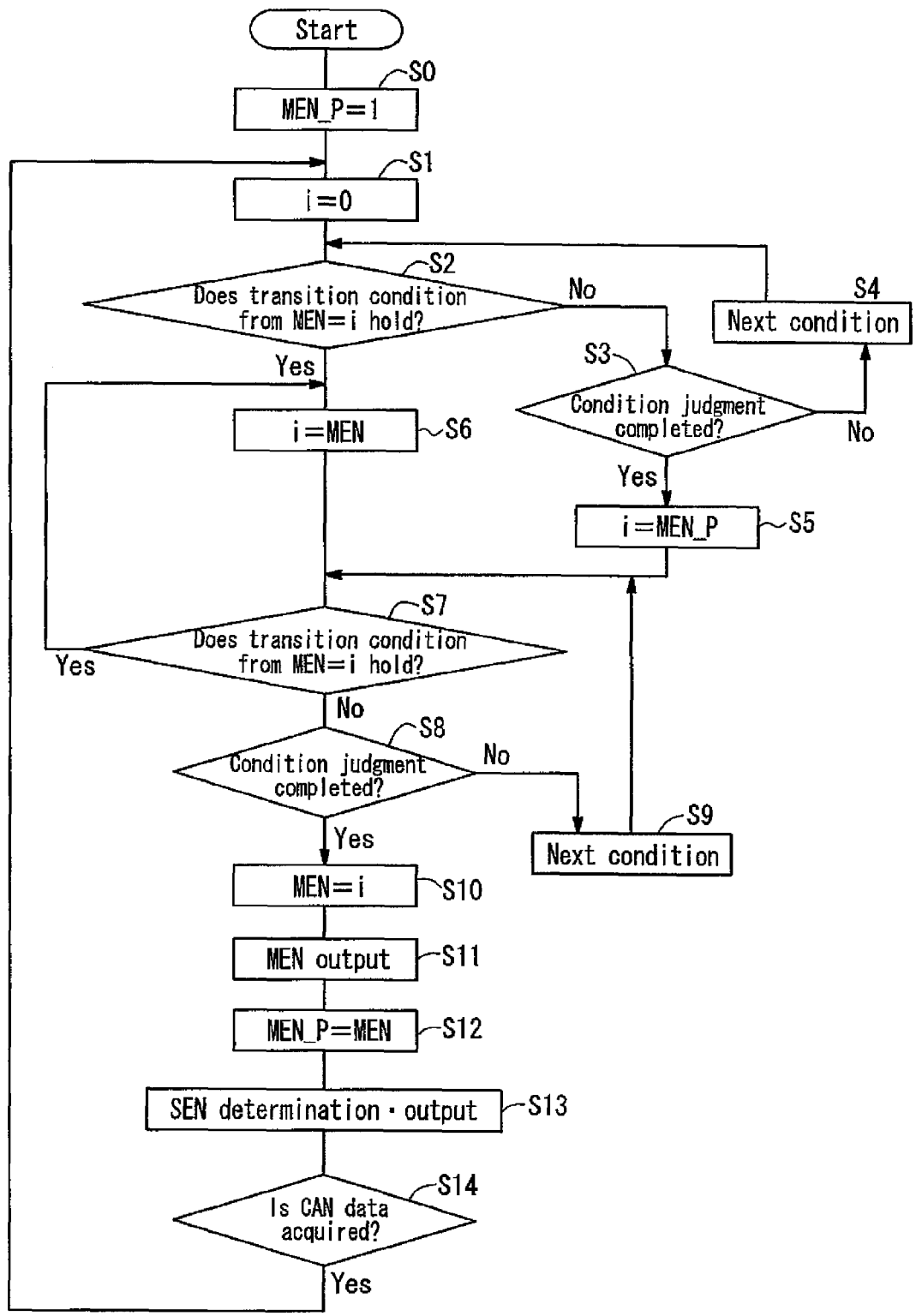
FIG. 10 is a flowchart showing a procedure of the process in which a DPF controller determines a MEN and a SEN when acquiring CAN data.

As shown in FIG. 10, when the DPF controller 21 is activated, first, the DPF controller 21 initializes MEN_P at 1 (Step S0) and initializes the value of a variable i at 0 (Step S1). Herein, the MEN_P is a variable for storing a MEN of a previous layout, and in this example, the MEN_P is to be set at 1 as an initial value in Step 60 immediately after the activation. It should be noted that the initial value can be set arbitrarily instead of 1. The variable i represents which MEN's transition condition the DPF controller 21 refers to. That is, the DPF controller 21 refers to the region $232c_i$ of the MEN transition table 232 in accordance with the value of i, and determines whether or not the transition condition described in the region $232c_i$ holds. Thus, every time the DPF controller 21 acquires CAN data, the DFP controller 21 executes Step S1, thereby first starting the determination from the transition condition in the region $232c_0$ of the MEN transition table 232 without fail.

Next, the DPF controller 21 uses the transition condition described first as a target for determination among the transition conditions described in the region $232c_0$, and determines whether or not the transition condition holds (Step S2).

Herein, if the transition condition does not hold (the result in Step S2 is No), in the case where the determination has not been completed up to the last transition condition described in the region $232c_0$ (the result in Step S3 is No), the DPF controller 21 uses the subsequent transition condition described in the region $232c_0$ as a target for determination (Step S4), and returns to Step S2 to repeat the determination process. On the other hand, in the case where the determination has been completed while any transition condition does not hold up to the last transition condition described in the region $232c_0$ (the result in Step S3 is Yes), the DPF controller 21 sets the value of a variable i at the value of MEN_P (Step S5). More specifically, in the case where none of the transition conditions holds from the state of "Transition start" immediately after the DPF controller 21 is activated, the value of i becomes the value (i.e., 1) set with respect to MEN_P in Step S0 in the present embodiment. In this case, the candidate of the value of a MEN is assumed to be 1, and the determination is restarted from the transition condition described in the region $232c_1$ by executing Step S7 next.

Further, in the case where any transition condition described in the region $232c_0$ holds (the result in Step S2 is Yes), the DPF controller 21 substitutes the value of a MEN described as the transition destination in the case where the transition condition holds into the variable i (Step S6).

Next, the DPF controller 21 uses a transition condition described first among the transition conditions described in the region $232c_i$, and determines whether or not the transition condition holds (Step S7). In the case where the transition condition holds (the result in Step S7 is Yes), the DPF controller 21 returns to Step S6 and repeats the processes in Steps S6 and S7. In the case where the transition condition does not hold (the result in Step S7 is No), and the determination has not been completed up to the last transition condition described in the region $232c_i$ (the result in Step S8 is No), the DPF controller 21 uses the subsequent transition condition described in the region $232c_i$ as a target for transition (Step S9) and returns to Step S7.

On the other hand, in the case where the determination has been completed while any transition condition does not hold up to the last transition condition described in the region $232c_i$ (the result in Step S8 is Yes), the DPF controller 21 sets the value of a MEN at i (Step S10). Thus, the value of the MEN is determined to be i.

The DPF controller 21 outputs the value of a MEN determined by the above process to the drawing controller 22 (Step S11). Further, the DPF controller 21 substitutes the determined value of a MEN into MEN_P (Step S12). Next, the DPF controller 21 matches the CAN data with the SEN issuing table 233, thereby determining the value of a SEN and outputting it to the drawing controller 22 (Step S13).

After that, when the DPF controller 21 newly acquires CAN data from the in-car LAN 70 (the result in Step S14 is Yes), the DPF controller 21 returns to Step S1 and restarts the processes in S1 to S13.

As described above, the DPF controller 21 can determine and output a MEN and a SEN in accordance with the procedure shown in FIG. 10. For example, in the case where a driver turns on a left winker during driving at a speed of 50 km, the value of a CAN variable representing the state of a "left winker" in the CAN data is turned "ON" by the operation. Further, at this time, the value of a CAN variable representing a "speed" in the CAN data is "50". In the case where the DPF controller 21 acquires the CAN data, when the 6th transition condition from above in the region $232c_0$ holds as a result of the successive judgment of the transition conditions in the region $232c_0$ shown in FIG. 9 from above, a candidate for the value of a MEN of a transition destination is determined to be 11. Further, when the transition conditions in the region $232c_{11}$ in which the transition conditions on a layout are described at MEN=11 are judged successively from above, any of transition conditions in the region $232c_{11}$ do not hold, so that MEN=11 is determined to be a value of a MEN. Thus, MEN=11 indicating that a layout of a subsequent transition destination is "left-turn driving" is output to the drawing controller 22.

Figures 13, 14:
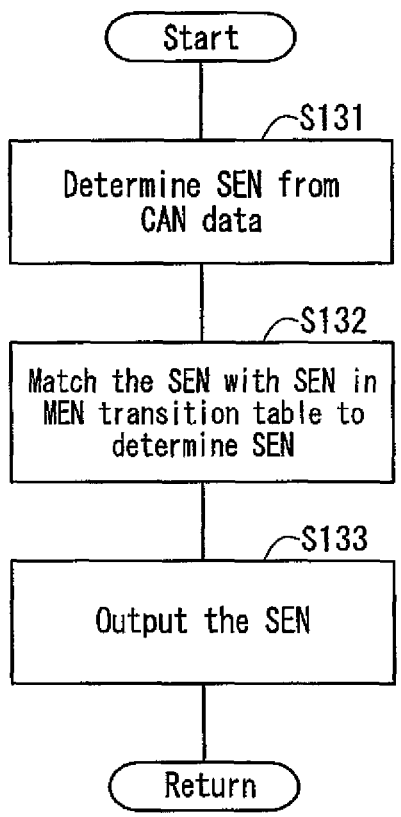
FIG. 13 is a flowchart showing an inner process in Step S13 of the flowchart shown in FIG. 10.
FIG. 14 is an explanatory diagram showing an example of the correspondence relation between a SEN and a speech data file.

Next, in Step S13, the process in which the DPF controller 21 determines and outputs the value of a SEN will be described with reference to FIGS. 11 to 13. FIG. 11 is an explanatory diagram showing one example of a data structure described in the region $233b$ of the SEN issuing table 233. FIG. 12 is an explanatory diagram showing exemplary contents of element images corresponding to SENs. FIG. 13 is a flowchart showing an inner process in Step S13 of the flowchart shown in FIG. 10.

The SEN issuing table 233 includes a region $233a$ in which the number of data (number of records) described in the region $233b$ is described and a region $233b$ in which the value of a SEN with respect to the value of each CAN variable is defined (see FIG. 6). As shown in FIG. 11, in the region $233b$ of the SEN issuing table 233, a CAN variable number, a comparison value, a time (1), a SEN number (1), a time (2), and a SEN number (2) are described. In the column of CAN variable No., CAN variable numbers defined in the CAN variable conversion table 231 shown in FIG. 7 are placed. Then, in the case where the value of a CAN variable represented by a CAN variable No. is equal to the value of a "comparison value", the values described in columns of SEN No. (1) and SEN No. (2) are determined as values of SENs. In the case where the column of Time (1) is 0, only the SEN No. (1) is issued. That is, in the case where the column of Time (1) is 0, 0 also is stored in the column of Time (2) and SEN No. (2). In the case where the column of Time (1) is not 0, the element image of SEN No. (1) is displayed for a period of time specified by Time (1), and an element image of SEN No. (2) is displayed for a period of time specified by Time (2), which are repeated. For example, as shown in FIG. 12, in the case where an element image corresponding to SEN "101" is a bitmap image representing "right winker [ON]", and an element image corresponding to SEN "102" is a bitmap image representing "right winker [OFF]", the state in which the right winker is flashing can be expressed. Thus, the flashing display of a winker or a warning light can be expressed. FIG. 11 shows an example in which the value of a SEN is defined with respect to the case where a CAN variable is equal to a comparison value. However, an operator of a CAN variable and a comparison value for determining the value of a SEN is not limited to only "=", and a comparison operator and the like may be defined.

As shown in FIG. 13, the DPF controller 21 first matches CAN data with the region $233b$ of the above-mentioned SEN issuing table 233, thereby determining the value of a SEN in accordance with the CAN data (Step S131). Then, the DPF controller 21 refers to the value (herein, assumed to be k) of the MEN determined and output in Step S11 in FIG. 10, and matches the value of a SEN listed at the last of the region $232c_k$ describing the transition condition regarding the layout of a value (k) of the MEN with the value of the SEN determined in Step S131 in the MEN transition table 232, and determines only the values included in the SEN listed at the last of the region $232c_k$ among the values of the SEN determined in Step S131 as a SEN to be output (Step S132). The DPF controller 21 outputs the value of the SEN determined in Step S132 to the drawing controller 22 (Step S133).

Due to the above process, only SENs of element images included in a layout specified by the MEN determined and output in Step S11 can be output to the drawing controller 22.

The Men and SEN determined as described above are sent from the DPF controller 21 to the drawing controller 22. The drawing controller 22 refers to a command table 25, using each of the MEN and SEN as an index. In the command table 25, a plurality of kinds of command groups are registered previously. The respective command groups are associated with respective values that can be taken by the MEN and the SEN uniquely. More specifically, the command groups for generating layout images are associated with the respective values that can be taken by the MEN. Further, the command groups for generating element images are associated with the respective values that can be taken by the SEN.

The drawing controller 22 reads and executes the command groups corresponding to the MEN and the SEN respectively from the command table 25. An image of a layout specified by a MEN is generated when the drawing controller 22 executes the command group corresponding to the MEN. Further, when the drawing controller 22 executes the command groups corresponding to the respective SENs, whereby element images of the number corresponding to the number of SENs are generated in accordance with the values of the respective SENs. A layout image and an element image are generated respectively on a plurality of planes different from each other for constituting an overlay image. Then, by overlaying a plurality of planes, a combined image of a combination of a layout image and an element image is generated and displayed on the liquid crystal display device 11.

The command groups in the command table 25 are previously created and registered so as to express a display suitable for the state of each part of an automobile. Examples of the commands include a command for reading each data (bitmap data) of a layout image and an element image from the image memory 26, a command for specifying the display position and the size of an element image, a command for increasing or reducing an element image in size, a command for specifying the rotation angle of an element image, and a command for transferring an image to each plane of an overlay image.

When the MEN and SEN are determined as described above, the value of the determined SEN also is sent to the speech controller 28. The speech controller 28 can specify a speech data file to be output, with reference to the speech data memory 24 based on the value of the determined SEN. More specifically, as shown in FIG. 14, the speech data memory 24 in the present embodiment stores a file name of speech data to be output in the case where the value of a SEN is determined to be the values, corresponding to at least part of the values of the SEN. That is, in the example shown in FIG. 14, in the case where SEN Nos. are "100", "101", and the like, it is not necessary to give warning or the like with a speech, so that these SEN Nos. are not associated with speech data file names. On the other hand, for example, SEN No. "201" (see FIG. 11) representing door warning [NG] is associated with a file name (herein, "f201.wav") recording a speech such as "please check a door" as a warning message notifying a user that a door has not been closed completely. The file format of speech data is arbitrarily selected without being limited to the specific example. Similarly, SEN No. "211" representing fuel warning [NG], SEN No. "221" representing hydraulic pressure warning [NG], SEN No. "231" representing battery warning [NG], and the like also are associated with file names recording a speech of a warning message in accordance with each situation.

The speech controller 28 acquires a speech file corresponding to the SEN received from the DPF controller 21 from the speech data memory 24 and outputs the contents thereof to an audio module 14. The audio module 14 reproduces the received speech file, whereby a speech message in accordance with a SEN No. is reproduced in an automobile. Thus, for example, in the case where SEN No. is determined to be the above-mentioned "201", an element image representing door warning [NG] is displayed on the liquid crystal display device 11, and a speech message notifying the user that a door has not been closed completely is reproduced. Thus, warning and operation instructions can be transmitted to a driver more exactly.

In the present embodiment, an example in which SEN No. and a speech file name are associated with each other and stored in the speech data memory 24 has been shown. However, the contents stored in the speech data memory 24 are not limited thereto. For example, a peculiar speech file identifier and the like are previously provided to each speech file, instead of storing SEN No. and a speech file name while associating them with each other directly, and the speech data memory 24 may be allowed to have a variable table of SEN Nos. and speech file identifiers. Alternatively, a speech file may be specified with each storage address.

Further, a configuration in which a speech file to be reproduced in accordance with SEN No. is specified has been illustrated. However, a speech file to be reproduced may be specified in accordance with MEN No. irrespective of SEN No. For example, in the case where a shift position is placed at "R", in the examples shown in FIGS. 8 and 9, the MEN No. of a transition destination becomes "4". The MEN No. "4" corresponds to, for example, a layout including a screen reflecting a monitor image at the back of an automobile. In this case, if a speech file name including a warning message, for example, "please pay attention to the back side" is associated with the MEN No. "4" in the speech data memory 24, a speech suitable for a retracting operation can be reproduced irrespective of a SEN in the layout.

As described above, in the information providing system for an automobile of the present embodiment, a combined image in accordance with the state of each part of an automobile can be generated and displayed on the liquid crystal display device 11. Further, in the information providing system for an automobile of the present embodiment, the difference in format of the state information D depending upon automobile manufacturers and vehicle types can be handled merely by changing the contents of the MEN/SEN determining table 23 appropriately. That is, the process program (for example, the procedure of the flowchart shown in FIG. 10) of the DPF controller 21 can be standardized irrespective of automobile manufacturers and vehicle types. This can reduce the development cost for an information providing system for an automobile.

The above-mentioned embodiments do not limit the technical range of the present invention, and can be changed variously within the scope of the invention. For example, in the above-mentioned specific examples., a screen displayed on the liquid crystal display device 11 is composed of a combination of a layout specified by one MEN and an element image specified by one or a plurality of SENs. However, for example, in the case of performing display in which a screen of the liquid crystal display device 11 is divided into a plurality of portions, and displaying images varied depending upon the viewing angle of the liquid crystal display device 11, etc., a plurality of layouts also can be used. Thus, in this case, a plurality of MENs are determined. Further, in the above embodiment, an example has been described in which one or a plurality of SENs are determined with respect to one MEN. However, one or a plurality of SENs may complexed with one SEN.

Further, in the above embodiment, an example has been shown in which two kinds: a MEN and a SEN are used as display identifiers. However, the number and kinds of the display identifiers are not limited to only the specific example. Further, FIGS. 6, 7, 9, 11, and the like show the specific examples of the identifier table used for determining display identifiers; however, these examples are merely shown for illustrative purposes, and various configurations of an identifier table are considered.

Further, a liquid crystal display device is used in the above-mentioned embodiment. However, a target for applying the present invention is not limited to an information providing system using a liquid crystal display device. As long as a portion displaying a combined image in accordance with state information is a dot matrix type display device, any display device can be used.

Further, the target for applying the present invention is not limited to only the above-mentioned information providing system to be incorporated in an instrument panel, as described above. For example, the present invention may be applied to a display device of a type displaying or projecting an image onto a window of a front surface of a driver's seat of a vehicle or the like, or an information providing system using a display device of a type to be mounted on a driver's body.

Further, the information providing system for a mobile body according to the present invention can display not only the state of a mobile body such as a vehicle but also additional information such as other arbitrary images (a still image or a moving image) (e.g., a video obtained by capturing a scene outside of a vehicle, a video stored on a storage medium provided at a vehicle, etc., a video obtained by communication with the outside, etc.) and character information.

INDUSTRIAL APPLICABILITY

The present invention can be used as an information generating device capable of easily generating a display identifier for displaying an image required for driving a mobile body such as an automobile on a display device from state information representing the state of each part of the mobile body and a speech identifier for outputting a speech in accordance with the state, a control device provided with the information generating device, an information providing system for a mobile body, a module for a driver's seat, and a mobile body.

The invention claimed is:

1. An information generating device that generates a display identifier for displaying an image in accordance with a situation of a mobile body on a dot matrix type display device based on state information collected from each part of the mobile body and a speech identifier for causing a speech reproducing device to reproduce a speech in accordance with the situation,
the display identifier including a layout identifier for specifying a layout of an image to be displayed on the display device, and an element image identifier for specifying a display form of an element image in the layout,
the information generating device comprising:
an identifier storing part that stores an identifier table defining a correspondence relation between the state information and the layout identifier, a correspondence relation between the state information and the element image identifier, a correspondence relation between the layout identifier and the element image identifier, and a correspondence relation between the state information and the speech identifier; and
an identifier determining part that acquires the state information collected from each part of the mobile body and matches the acquired state information with the identifier table, thereby determining and outputting a layout identifier, an element image identifier, and a speech identifier in accordance with the situation of the mobile body when the state information is collected.

2. The information generating device according to claim 1, wherein the identifier table defines a transition relationship between a plurality of layouts and a transition condition to be satisfied by the state information so that a transition is effected between the layouts as a correspondence relation between the state information and the layout identifier, and
the identifier determining part matches the acquired state information with the transition condition of the identifier table every time acquiring the state information collected from each part of the mobile body, thereby determining and outputting a layout identifier of a layout that is to be a transition destination.

3. The information generating device according to claim 2, wherein the transition condition is defined by a comparison expression of a variable contained in the state information and a predetermined value in the identifier table, and
the identifier table includes a variable conversion table for extracting the variable from the state information.

4. The information generating device according to claim 1, wherein the identifier table defines a display form of an element image to be included in each layout as a correspondence relation between the layout identifier and the element image identifier, and
the identifier determining part matches the acquired state information with the identifier table every time acquiring the state information collected from each part of the mobile body, thereby determining a layout identifier and an element image identifier, and determines an element image identifier associated with the determined layout identifier in a correspondence relation between the layout identifier and the element image identifier as an element image identifier to be output.

5. A control device, comprising:
the information generating device according to claim 1;
an image storing part that stores a layout image corresponding to each layout identifier and an element image corresponding to each element image identifier;
an image combining part that acquires a layout identifier and an element image identifier output from the identifier determining part of the information generating device, and extracts and combines a layout image corresponding to the layout identifier and an element image corresponding to the element image identifier from the image storing part, thereby generating an image to be displayed on the display device;
a speech storing part that stores speech data corresponding to each speech identifier; and
a speech output part that acquires a speech identifier output from the speech identifier determining part of the information generating device, extracts speech data corresponding to the acquired speech identifier from the speech storing part, and outputs the speech data to a speech reproducing device.

6. An information providing system for a mobile body, comprising:
the control device according to claim 5;
a display device that displays an image generated by the image combining part of the control device; and a speech reproducing device that reproduces speech data output from the speech output part.

7. The information providing system for a mobile body according to claim 6, wherein the display device is a liquid crystal display device.

8. A module for a driver's seat attached around a driver's seat of the mobile body, comprising the information providing system for a mobile body according to claim 6.

9. A mobile body comprising the information providing system for a mobile body according to claim 6, wherein the display device is attached to a position where the display device is recognizable visually at least from a driver's seat.

10. The mobile body according to claim 9, wherein the mobile body is an automobile, and the state information is sent from an ECU provided in each part of the automobile to be collected in the information generating device via an in-car network.

* * * * *